United States Patent
Valentin et al.

(10) Patent No.: US 7,207,555 B2
(45) Date of Patent: Apr. 24, 2007

(54) SUPPORT FOR MOVING CYLINDRICAL ELEMENTS AND METHOD AND CONVEYOR USING SUCH SUPPORTS

(75) Inventors: Michel Valentin, Bagnols sur Ceze (FR); Jacques Verdollin, Rillieux la Pape (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 182 days.

(21) Appl. No.: 10/500,668

(22) PCT Filed: Jan. 13, 2003

(86) PCT No.: PCT/FR03/00085

§ 371 (c)(1),
(2), (4) Date: Jun. 30, 2004

(87) PCT Pub. No.: WO03/059791

PCT Pub. Date: Jul. 24, 2003

(65) Prior Publication Data

US 2005/0121563 A1 Jun. 9, 2005

(30) Foreign Application Priority Data

Jan. 15, 2002 (FR) .................................. 02 00430

(51) Int. Cl.
*B23Q 3/00* (2006.01)

(52) U.S. Cl. ................................. 269/289 MR; 248/132

(58) Field of Classification Search ................ 248/132; 269/289 MR; 193/35 R, 37, 35 B, 35 SS
See application file for complete search history.

(56) References Cited

U.S. PATENT DOCUMENTS

| 1,349,070 | A | | 8/1920 | Latshaw |
| 2,667,978 | A | * | 2/1954 | Pridy .......................... 414/433 |
| 4,470,291 | A | * | 9/1984 | Gibb et al. .................... 72/414 |
| 4,852,623 | A | * | 8/1989 | Rodrigues .................... 144/287 |
| 5,673,843 | A | * | 10/1997 | Gainey ....................... 228/44.5 |
| 5,843,369 | A | * | 12/1998 | Obara et al. ................... 420/34 |
| 5,934,626 | A | * | 8/1999 | Collins, Jr. ................... 248/132 |

FOREIGN PATENT DOCUMENTS

| DE | 28 08 812 | 8/1979 |
| DE | 30 40 447 | 8/1982 |
| FR | 1 388 073 A | 2/1965 |

* cited by examiner

*Primary Examiner*—Amy J. Sterling
(74) *Attorney, Agent, or Firm*—Pearne & Gordon LLP

(57) ABSTRACT

The invention relates to a support (1) for rolling cylindrical elements, this support comprising first guide means (2) capable of guiding the cylindrical elements at a height z1. Downstream, in a direction in which the cylindrical elements roll, the said support (1) comprises second guide means capable of guiding the cylindrical elements at a height z2 higher than z1, the friction between the second guide means and the cylindrical elements being lower than the friction between the first guide means (2) and the cylindrical elements.

11 Claims, 3 Drawing Sheets

SUPPORT FOR MOVING CYLINDRICAL ELEMENTS AND METHOD AND CONVEYOR USING SUCH SUPPORTS

TECHNICAL FIELD

The technical field of this invention is that of supports capable of receiving cylindrical elements, such as tubes, and to ensure their flow in a direction parallel to the axis of these cylindrical elements. Furthermore, the technical field of this invention relates to the devices used to transport cylindrical elements and transport methods for cylindrical elements using such supports. More specifically, the invention may also apply to cylindrical support elements designed to permit the translation of the latter with respect to the supports, as well as the rotation of these cylindrical elements around their axis when they are in contact with these same supports.

STATE OF THE PRIOR TECHNIQUE

In this field, we know transport devices comprising a number of tube supports, these supports each disposing of a roller capable of authorising the rolling of these tubes in a direction parallel to the axis of these tubes. Each support comprises a roller with a Vee shaped groove designed to co-operate with the tubes when they pass on this support. This type of roller is used due to the nature of the tubes to be transported as well as the distance used between the various supports.

In fact, at the output end of a support, the tube is in an overhanging position, which causes its downstream end to bend. This downstream end of the tube, when it arrives on the next support, is at a lower height than the part of the tube supported by the support roller upstream in the direction of the rolling. The cylindrical form of the roller therefore permits the height of the downstream end of the tube to be corrected progressively, without damaging this end. At the output end of the roller, the downstream end of the tube is then situated in a horizontal plane at more or less the same height as the rest of the tube.

However, the system described in the prior art has several disadvantages.

In this type of transport device, it is known to be difficult to align the supports vertically and horizontally, due to the delicate adjustment to be made to the supports with respect to one another, but also due to the geometry of the tubes themselves, which has specific tolerances for the shape and circularity.

This alignment defect encountered causes a sliding phenomenon between the sides of the Vee groove of the rollers and the tubes rolling on these rollers. These movements cause the tearing off of metallic particles from the outside surface of the tube. These particles, once they have been torn off, become incrusted in the sides of the Vee groove of the rollers, thus creating a sort of abrasive surface.

At the output of the transport device, the tubes therefore have longitudinal marks on their outside surface and these marks thus later the visual appearance of the finished product.

Furthermore, it may be that such transport devices are also designed to allow a rotation of the tubes themselves, for example to permit a welding operation. In this case, the tearing off of the metallic particles of the tube will be another disadvantage to the one previously mentioned. In fact, the particles incrusted on the sides of the Vee groove of the rollers form a surface that can be compared to an abrasive surface, which amplifies the friction between the rollers and the tubes when the latter rotate. The direct consequence of the rotation is the appearance of circular marks on the outside surface of the tubes, these marks adding to those from the simple rolling and thus further damage the visual appearance of the finished product.

OBJECT OF THE INVENTION

The purpose of the invention is therefore to present a support for cylindrical elements which minimises as far as possible the marking effects on the outside surface of these cylindrical elements, when they roll on the support.

Another purpose of the invention is to present a transport device for cylindrical elements as well as a transport method for cylindrical elements, this transport device and this method using at least one support such as that which overcomes the technical problem raised above.

To do so, the object of the invention is a support for rolling cylindrical elements, this support comprising first guide means capable of guiding the cylindrical elements at a height $z_1$. According to the invention, downstream in a direction of the rolling of the cylindrical elements, the support comprises second guide means capable of guiding the cylindrical elements at a height $z_2$ that is greater than $z_1$, the friction between the second guide means and the cylindrical elements being lower than the friction between the first guide means and the cylindrical elements.

The main advantage of this invention with respect to the existing devices of the prior art lies in the addition of the second guide means. According to the invention, the cylindrical element rolling on the support only has a brief contact with the first guide means. In fact, this contact only occurs when the downstream end of the tube arrives on the support, the first guide means then pass their role to the second guide means due to their possibility of maintaining the cylindrical elements at a height greater than the height at which the first guide means are capable of holding these cylindrical elements. Due to this different in height, the passage of the cylindrical elements on the second guide means marks the end of the contact between the first guide means and the cylindrical elements, for the rest of the rolling of these elements.

As the friction resulting from the contact between the second guide means and the cylindrical elements is lower than the friction resulting from the contact between the first guide means and these same cylindrical elements, the phenomenon of the tearing off of metallic particles from the cylindrical elements is greatly reduced, which consequently significantly improves the visual quality of the finished product. The harmful consequences of the alignment defect of the supports with respect to one another are therefore almost completely eradicated.

Preferably, the second guide means are capable of authorising a rotation of the cylindrical elements around an axis of these cylindrical elements.

The advantage which arises from this specific characteristic concerning the second guide means consists in the possibility of being able to pivot the cylindrical element on itself, around its axis, which is particularly useful when an operation such as welding of the rolling elements is to be carried out.

Furthermore, this rotation of the cylindrical elements is carried out when the latter are in contact with the second guide means. The rotation therefore causes less circular marks due to two distinct factors. The first factor concerns the structure itself of the second guide means which permit lower friction with respect to the friction encountered in the prior art when the tubes are rotated on the rollers. The second factor is based on the doubling of the guide means, thus permitting the cylindrical element to be rotated on guide means that have only accumulated a few metallic particles during the rolling. These two factors simultaneously contribute to minimising the circular marks of the rotating cylindrical elements.

Preferably, the second guide means comprise at least two ball bearings designed to be in contact with the said cylindrical elements. Advantageously, this ball bearing system permits a coefficient of friction to be obtained that is as low as possible to eliminate the maximum amount of marks on the cylindrical elements.

The ball bearings are, according to one specific embodiment of the invention, made from stainless steel. Advantageously, these ball bearings resist correctly to the incrustation of metallic particles from the cylindrical elements. Furthermore, stainless steels are recommended for contact with Zircaloy tubes (registered trade mark), this type of tube may be transported by the supports according to the invention.

Still in the aim of reducing the friction between the support and the cylindrical elements, each ball bearing rests on a number of secondary balls situated in a housing holding the ball bearing.

Preferably, the second guide means comprise two ball bearings each with their housing angled at 45° with respect to the main axis of the support, this axis being perpendicular to the direction of the rolling of the cylindrical elements. Advantageously, this permits the rotation of the cylindrical element without ejecting it during the rotation movement.

Furthermore, the two balls are positioned so that one of them is situated upstream of the other, in the direction of the rolling of the cylindrical elements. This specific layout has been adopted due to the necessity of keeping the mechanical unit as compact as possible, in order to reduce the size of the support as much as possible.

Preferably, the support comprises a lateral adjustment system for the assembly formed by the first and second guide means, as well as a vertical adjustment system for this same assembly formed by the first and second guide means. These two adjustment systems permit the alignment to be made as precisely as possible when using supports that are different from one another.

The support according to the invention may also comprise means capable of adjusting the height between the height $z_1$ and the height $z_2$, so as to favour as much as possible the passage of the cylindrical elements between the first and second guide means. This difference in height may be around 0.5 mm.

Finally, the first guide means may comprise a Vee shaped roller. This use of a roller advantageously permits the end of the cylindrical element to be straightened up in a horizontal plane, so that it comes into contact with the second guide means in the best possible way.

Another object of the invention is a transport device for cylindrical elements cylindrical elements comprising at least one support as previously described, each support being capable of authorising the rolling of cylindrical elements.

Furthermore, another object of the invention is a method of transporting cylindrical elements on at least one support, as previously described, these cylindrical elements, when they pass on each support, undergo the following steps:
primary guiding with the aid of first guide means,
secondary guiding substituting the primary guiding, with the aid of second guide means, the friction resulting from the secondary guiding being lower than the friction resulting from the primary guiding.

Other characteristics and advantages of the invention will appear in the detailed, non-restrictive description below.

BRIEF DESCRIPTION OF THE DRAWINGS

This description will be made with reference to the appended diagrams, among which.

DETAILED DESCRIPTION OF PREFERRED EMBODIMENTS

Figure 1:
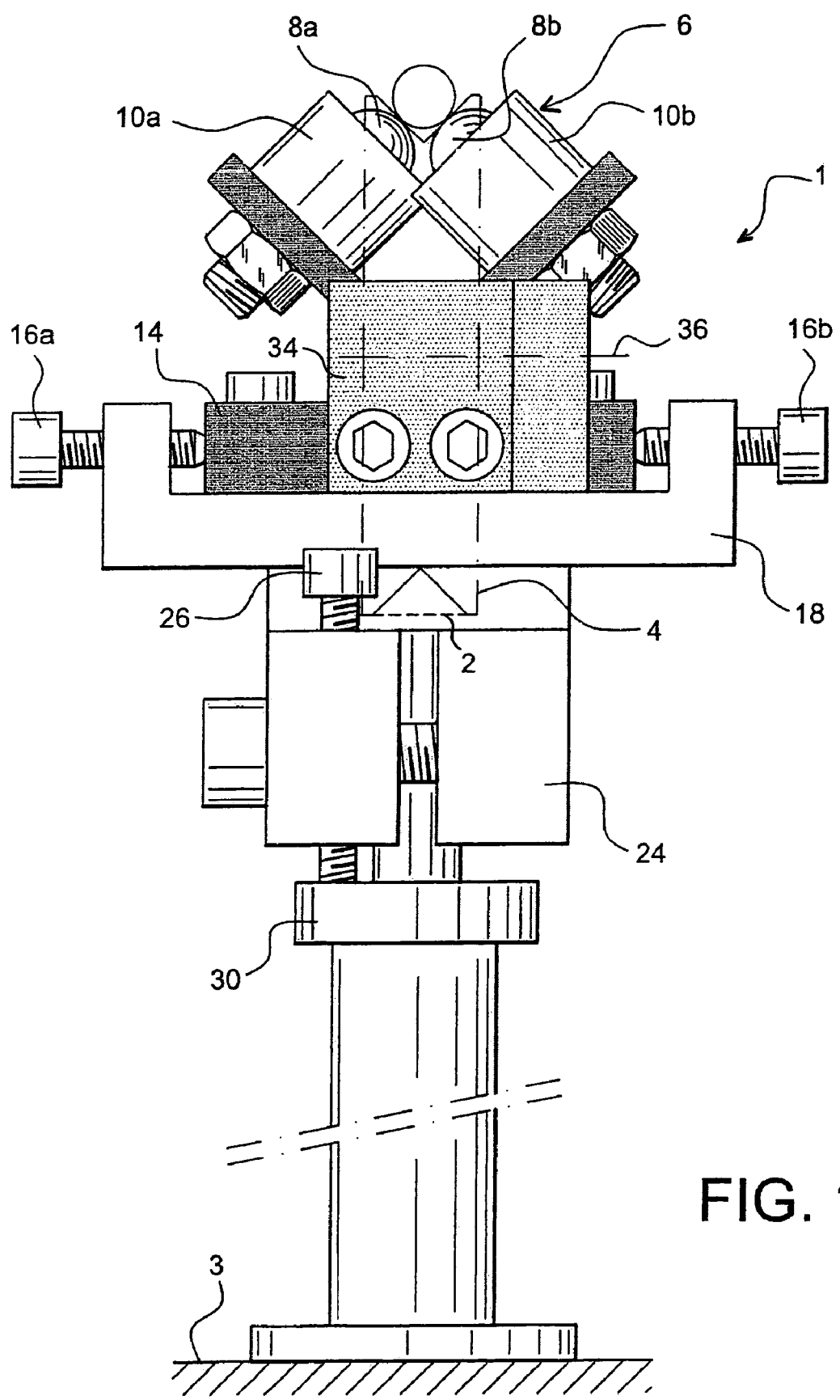
FIG. 1 represents a front view of a support according to one preferred embodiment of the invention.
Figure 2:
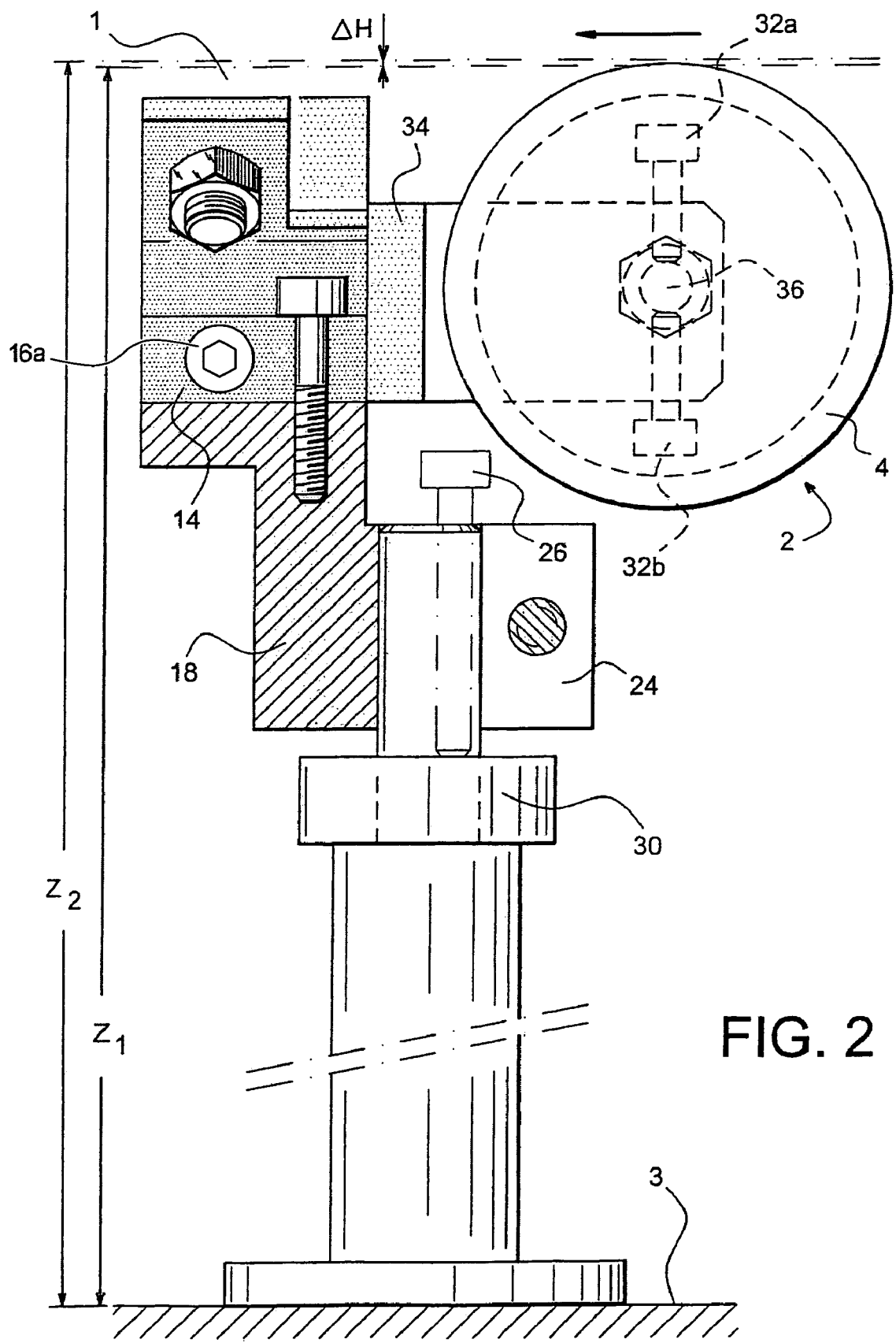
FIG. 2 represents a side view of a support, according to one preferred embodiment of the invention.

In reference to FIGS. 1 and 2, we can see a support 1 according to one preferred embodiment of the invention, for rolling cylindrical elements. This support 1 is capable of authorising the movement of cylindrical elements in a direction parallel to the axis of these elements, this direction being named the rolling direction of the cylindrical elements and is represented by the arrow in FIG. 2. In this preferred embodiment of the invention, the support 1 may also authorise a rotational movement of the cylindrical elements, this rotation being made around an axis of these cylindrical elements. In this case, the cylindrical elements may then pivot on themselves.

The support 1 is fixed rigidly to a frame 3, capable of holding it in a stable position, in order to avoid any uncontrolled movements of the support 1 when the cylindrical elements pass on it.

The support 1 firstly comprises first guide means 2 capable of guiding the cylindrical elements. These first guide means preferably comprise a roller 4 whose axis 36 is perpendicular to the direction in which the cylindrical elements roll. Made from plastic, preferably Ertalon (registered trade mark), this roller 4 has a Vee shaped groove designed to co-operate with the rolling cylindrical elements. The roller 4 is dimensioned so that it holds the cylindrical elements at a height z1, this height z1 may have the frame 3 as its origin.

Downstream in the direction in which the cylindrical elements roll, the support 1 comprises second guide means 6. These second guide means are also capable of guiding the cylindrical elements in the required direction, but may also, in preference, permit the rotation of these cylindrical elements on themselves.

Figure 3:
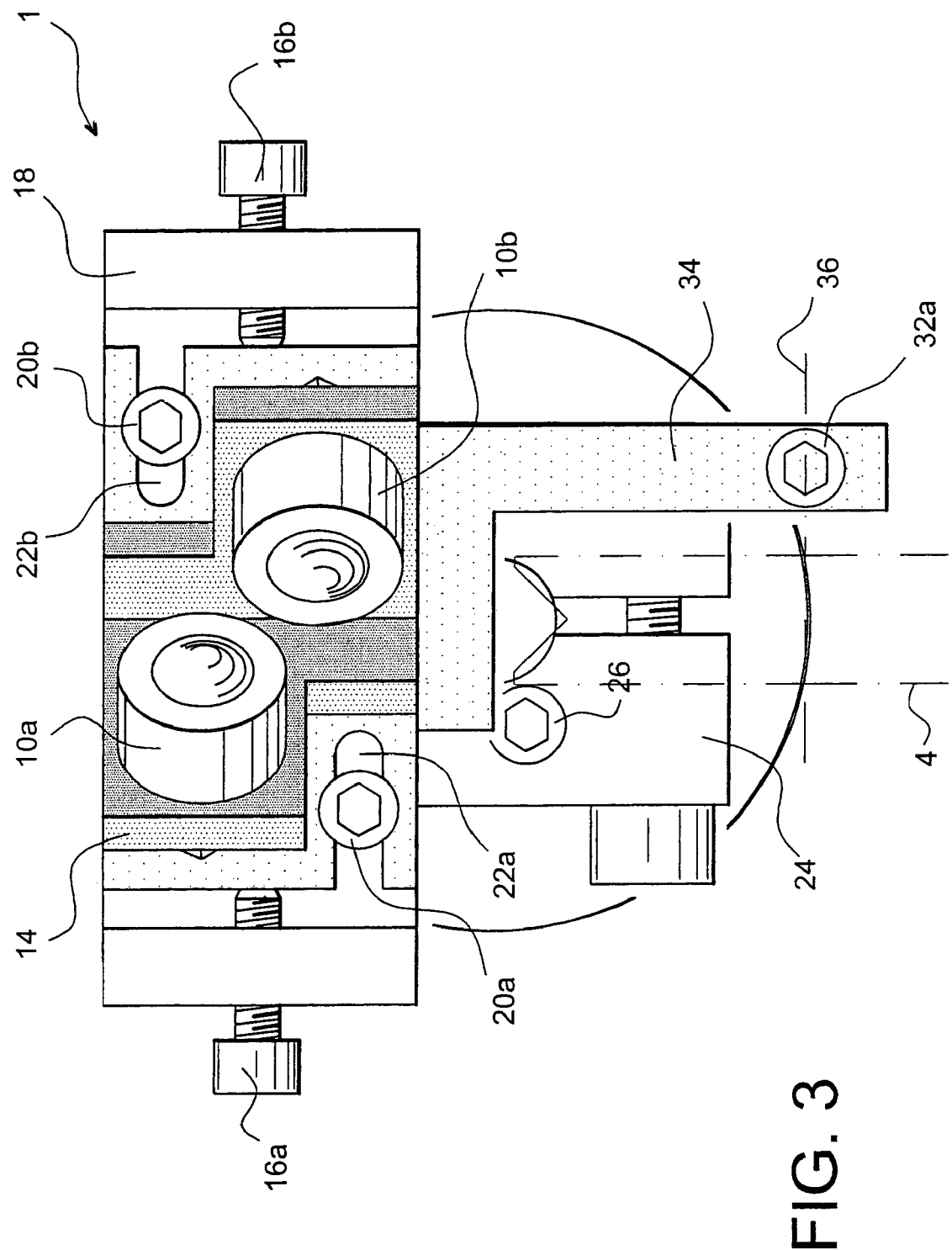
FIG. 3 represents an overhead view of a support, according to one preferred embodiment of the invention

In reference to FIG. 1 and to FIG. 3, the second guide means 6 comprise a system of ball bearings, preferably comprising two ball bearings 8a, 8b, capable of being in contact with the cylindrical elements, the two ball bearings 8a, 8b, being respectively situated in the housings 10a, 10b. Inside these housings 10a, 10b, are housed a number of secondary balls (not shown) The ball bearings 8a, 8b, are preferably made from stainless steel.

The housings 10a, 10b, are positioned at an angle. In fact, in this preferred embodiment of the invention, the housings are angled at 45° on either side of a main axis of the support, this main axis being perpendicular to the direction in which the cylindrical elements roll. Furthermore, the two ball bearings 8a, 8b, are positioned such that one of them is positioned upstream of the other, in the direction in which the cylindrical elements roll.

The second guide means are then positioned to guide the cylindrical elements to a height $z_2$, still with the frame 3 for origin, this height $z_2$ being higher to the height $z_1$. The second guide means 6 are such that the friction resulting from their contact with the cylindrical elements, when the latter roll, is lower than the friction resulting from the contact between the first guide means and these same cylindrical elements.

The specific adopted layout between the first and second guide means 2 and 6 reveals to be of interest when the cylindrical elements roll.

In operation, a cylindrical element arriving close to the support 1 is positioned at a low position with respect to the first guide means 2. This position is due to the fact that a downstream part of the cylindrical element is overhanging, and is therefore subject to flexion. The first guide means 2 therefore have to straighten up the overhanging part of the element, so that the cylindrical element assembly is situated in a more or less horizontal plane. It is during this contact between the roller 4 and the cylindrical element that the phenomenon of tearing off of metallic particles from the cylindrical element can be observed, this phenomenon particularly arising from alignments defects between the various supports 1 when they are positioned next to one another. Sliding therefore takes place between this cylindrical element and the sides of the Vee groove of the roller 4.

The cylindrical element continues its movement on the support 1, and then rapidly comes into contact with the second guide means 6. These second guide means 6, situated downstream in the direction in which the cylindrical elements roll, are positioned so that the contact is lost between the first guide means 2 and the cylindrical element, when the latter comes into contact with the second guide means 6. In other words, when the cylindrical elements roll, the second guide means 6 substitute the first guide means 2. In this way, the ball bearings 8a, 8b, can take over from the roller 4 and consequently limit the phenomenon of tearing off of metallic particles due to the virtual absence of friction of these ball bearings 8a, 8b, on the cylindrical elements. In addition, when we want to have the cylindrical elements rotate, this is done on the ball bearings 8a, 8b, whereas the vast majority of the particles torn off are located on the roller 4. The outside surface of the cylindrical elements is therefore spared from circular marks caused by the unavoidable depositing of particles on the rollers.

In operation, it would appear necessary to use first guide means 2 to re-establish the position of the overhanging cylindrical element. This is why that in preference a roller 4 is used permitting a frontal collision between the ball bearings 8a, 8b, or their housing 10a, 10b, and the cylindrical elements rolling to be avoided. However, we are trying to have a contact between the roller 4 and the cylindrical element which lasts the shortest time possible, in order to avoid the phenomenon of tearing off of particles, while ensuring that the cylindrical elements are straightened up. By way of example, to satisfy these requirements, the difference between the height $Z_2$ and the height $z_1$ is approximately 0.5 mm. Furthermore, the distance between the top of the roller 4 and the ball bearings 8a, 8b is approximately 70 mm.

Each support 1 also comprises adjustment systems due to the necessity of aligning these various supports 1, when they are placed next to one another.

We can first note a lateral adjustment system formed by the first and second guide means 2 and 6, the lateral direction corresponding to the direction perpendicular to the direction in which the cylindrical elements roll, in a horizontal plane.

As the first and second guide means 2 and 6 are fixed with respect to one another in this lateral direction, a simple adjustment system operating on a support 14 of the second guide means 6 is consequently sufficient. In reference to FIGS. 1 and 3, this system comprises two screws 16a, 16b, screwed opposite one another into a base 18 on which the support 14 rests, each of these screws being designed to be in contact with this support 14. A simple adjustment of them permits lateral alignment of the guide means 2 and 6 of the various supports 1. It is noted that this adjustment system also comprises two guide and clamping screws 20a, 20b, respectively co-operating with two grooves 22a, 22b, of the support 14. These screws 22a, 22b, have the double function of authorising the movement of the support 14 in the lateral direction when they are loose, and of holding the support 14 to the base 18 once it is correctly positioned.

To this lateral adjustment system, we can add a vertical adjustment system for the assembly formed by the first and second guide means 2 and 6. This adjustment is carried out in the direction of the main axis of the support. In reference to FIG. 2, an adjustment screw 26 is situated in a first moving body 24 and a fixed body 30. The first moving body 24 is attached to the base 18 whereas the second fixed body 30 is attached to the frame 3.

When the screw 26 is screwed, the first moving body 24 is translated vertically with respect to this screw 26, whereas the second fixed body 30 is blocked in translation with respect to this same screw 26. This arrangement permits, by means of the vertical movement of the moving body 24, the height of the assembly formed by the first 2 and second 6 guide means to be adjusted.

According to this preferred embodiment of the invention, the support 1 comprises means capable of adjusting the difference between the height $z_1$ and the height $z_2$. These means are therefore added to the vertical adjustment system previously described, which only concerns the adjustment of the height of the assembly formed by the first and second guide means 2 and 6. In return, these means capable of adjusting the difference in height are not for a need of alignment between the guide means 2 and 6 of the various supports 1, but are intended to favour in the best possible way the passage of the cylindrical element from the first guide means 2 to the second guide means 6. An optimal adjustment of the height between these two means thus permits a frontal collision between the cylindrical element and the second guide means 6 to be avoided. Preferably, the ΔH between the height $z_2$ and the height $z_1$, symbolised in FIG. 2, is a few tenths of a millimetre.

These means capable of adjusting the difference in height comprise two screws 32a, 32b, positioned vertically and opposite one another in a body 34 supporting the roller 4. The movement of these screws 32a, 32b, causes the movement of an axis 36 of the roller 4 relative to the body 34, attached to the support 14. This specific layout therefore procures fine adjustment, permitting the relative vertical positions of the first and second guide means 2 and 6 to be adjusted correctly.

The invention also relates to a transport device for cylindrical elements comprising at least one support 1 as described above. Each support 1 is capable of authorising the rolling of the cylindrical elements. By way of example, for cylindrical elements approximately 4 m long, the various supports 1 are separated by a distance of approximately 60 cm. This example relates to a transport device for Zircaloy (registered trade mark) tubes in which combustible pellets are to be inserted, notably composed of a mixed uranium and plutonium oxide, in order to form the component elements of a nuclear reactor core.

Furthermore, the invention relates to a transport method for cylindrical elements on at least one support as described previously. The cylindrical elements, when they pass on each support, 1, undergo different successive steps.

First of all, these cylindrical elements undergo primary guiding with the aid of the first guide means 2. This is carried out by the roller 4 straightening the downstream part of the cylindrical elements that are in an overhanging position.

Once this primary guiding has been completed, the cylindrical elements undergo secondary guiding which substitutes the primary guiding. This secondary guiding is carried out by means of the second guide means 6, the friction resulting from the secondary guiding being lower than the friction resulting from the primary guiding. This secondary guiding is carried out with the aid of ball bearings 8a, 8b, also capable of authorising the rotation of the cylindrical elements around their axis. By way of example, this rotation is particularly of interest when a welding operation is to be carried out on the end of the cylindrical elements. To use the previous example, this case may arise when the tubes filled with pellets need to be sealed by means of a plug welded onto the end of the tube.

Of course, various modifications may be made by those skilled in the art, to the transport device and method that have been described above, by way of non-restrictive example.

The invention claimed is:

1. Support for rolling a cylindrical element, this support comprising first guide means capable of guiding the cylindrical element at a height z1, characterized in that downstream in the direction in which the cylindrical element rolls, the said support comprises second guide means capable of guiding the cylindrical element at a height z2 higher than z1, wherein an amount of friction between the said second guide means and the cylindrical element is lower than an amount of friction between the first guide means and the cylindrical element and also the first guide means comprise a Vee shaped roller.

2. Support according to claim 1, characterized in that the said second guide means are capable of authorizing a rotation of the cylindrical elements around an axis of these cylindrical elements.

3. Support according to claim 1, characterized in that the second guide means comprise at least two ball bearings designed to be in contact with the said cylindrical elements.

4. Support according to claim 3, characterized in that the said ball bearings are made of stainless steel.

5. Support according to claim 3, characterized in that housings for the two ball bearings each are angled at 45° with respect to a main axis of the support, perpendicular to the direction in which the cylindrical elements roll.

6. Support according to claim 5, characterized in that the two ball bearings are positioned such that one of them is situated upstream of the other, in the direction in which the cylindrical elements roll.

7. Support according to claim 1, characterized in that the support comprises a lateral adjustment system for the assembly that moves the cylindrical element wherein the lateral adjustment system is formed by the first and the second guide means, as well as a vertical adjustment system for this same assembly formed by the first and the second guide means.

8. Support according to claim 1, characterized in that the support comprises means capable of adjusting the difference between the height z1 and the height z2.

9. Support according to claim 1, characterized in that the difference between the height z1 and the height z2 is approximately 0.5 mm.

10. Cylindrical element transport device, characterized in that it comprises at least one support according to any of claims 1 to 9, each support being capable of authorizing the rolling of the said cylindrical elements.

11. Method of transporting cylindrical elements on at least one support, according to any of claims 1 to 9, characterized in that the cylindrical elements, when they pass on each support, undergo the following steps:

primary guiding with the aid of first guide means, secondary guiding substituting the primary guiding with the aid of second guide means, the friction resulting from the secondary guiding being lower than the friction resulting from the primary guiding.

* * * * *